United States Patent
Cheng

(10) Patent No.: US 8,903,162 B2
(45) Date of Patent: Dec. 2, 2014

(54) METHOD AND APPARATUS FOR SEPARATING AN IMAGE OBJECT FROM AN IMAGE USING THREE-DIMENSIONAL (3D) IMAGE DEPTH

(75) Inventor: Kun-Nan Cheng, Hsinchu County (TW)

(73) Assignee: MStar Semiconductor, Inc., Hsinchu County (TW)

( * ) Notice: Subject to any disclaimer, the term of this patent is extended or adjusted under 35 U.S.C. 154(b) by 349 days.

(21) Appl. No.: 13/216,823

(22) Filed: Aug. 24, 2011

(65) Prior Publication Data
US 2012/0281905 A1   Nov. 8, 2012

(30) Foreign Application Priority Data
May 5, 2011   (TW) .............................. 100115846 A

(51) Int. Cl.
G06T 15/00   (2011.01)
G06T 7/00   (2006.01)
H04N 13/00   (2006.01)

(52) U.S. Cl.
CPC .......... *G06T 7/0081* (2013.01); *H04N 13/0007* (2013.01); *H04N 2013/0081* (2013.01); *G06T 2207/20144* (2013.01)
USPC ........................................................ 382/154

(58) Field of Classification Search
None
See application file for complete search history.

(56) References Cited

U.S. PATENT DOCUMENTS

| | | | | |
|---|---|---|---|---|
| 8,139,204 | B2* | 3/2012 | Braune et al. ................. | 356/4.01 |
| 2004/0105074 | A1* | 6/2004 | Soliz et al. ..................... | 351/206 |
| 2004/0239670 | A1* | 12/2004 | Marks ............................ | 345/419 |
| 2007/0038944 | A1* | 2/2007 | Carignano et al. ............. | 715/757 |
| 2011/0211749 | A1* | 9/2011 | Tan et al. ....................... | 382/154 |

\* cited by examiner

*Primary Examiner* — Brian P Werner
(74) *Attorney, Agent, or Firm* — WPAT, PC; Justin King

(57) ABSTRACT

A method of image processing is provided for separating an image object from a captured or provided image according to a three-dimensional (3 D) depth and generating a synthesized image from the image portions identified and selectively modified in the process. The method retrieves or determines a corresponding three-dimensional (3D) depth for each portion of an image, and enables capturing a selective portion of the image as an image object according to the 3D depth of each portion of the image, so as to synthesize the image object with other image objects by selective processing and superimposing of the image objects to provide synthesized imagery.

17 Claims, 3 Drawing Sheets

METHOD AND APPARATUS FOR SEPARATING AN IMAGE OBJECT FROM AN IMAGE USING THREE-DIMENSIONAL (3D) IMAGE DEPTH

This application claims the benefit of Taiwan application Serial No. 100115846, filed May 5, 2011, the subject matter of which is incorporated herein by reference.

BACKGROUND OF THE INVENTION

1. Field of the Invention

The invention relates in general to a method of image processing and associated apparatus, and more particularly, to a method for separating an image object from an image according to a three-dimensional (3D) depth and associated apparatus.

2. Description of the Related Art

With the ability to enhance quality, data amount, data content, and amusement of static and/or dynamic images, image processing and synthesis have become prevalent in modern society. For example, background removal is a common image processing performed on digital images. The image background removal process captures significant foregrounds of the image as independent image objects, so that the foregrounds can be separated from the remaining, less important background portions.

In the prior art, background removing is generally performed with chroma keying. During chroma keying, main substances forming the foregrounds are placed in front of a monochromatic (blue or green) background to be captured with the monochromatic background as an image. Subsequently, with post-image processing, the monochromatic background is removed from the image and the foregrounds are obtained as foreground image objects, which are then synthesized with a separately formed background image to form a new image. In another conventional background removing technique, the foreground image objects are separated from the background according to edges and/or color differences between the foreground objects and the background.

However, the above solutions associated with the prior art suffer from various application drawbacks. For example, when colors of certain parts of the foreground objects approximate or are identical to a color of the background, the parts are improperly removed during the background removal, and incomplete foreground objects are then formed. Furthermore, for a rather complicated foreground and/or a foreground with less apparent edges between the foreground and the background, difficulties may arise when applying the prior art techniques to correctly acquire the foreground image objects from the image.

SUMMARY OF THE INVENTION

The invention is directed to a method of image processing according to a determined three-dimensional (3D) depth. A foreground of a static or dynamic image is captured as an image object according to the 3D depth, so that the foreground image object may be utilized in a subsequent image processing, such as image synthesis.

According to an embodiment of the present invention, a method of image processing is provided. The method comprises receiving an image, providing a 3D depth corresponding to a portion of the image, capturing the portion of the image as a distinct image object (first image object) according to the 3D depth corresponding to the portion, providing a second image object, and superimposing the first image object and the second image object to generate a synthesized image.

In an embodiment, the first image object and/or the second image object is pre-processed, and the pre-processed first image object (i.e. the first superimposing object), and/or a pre-processed second image object (i.e. the second superimposing object), are superimposed to generate the synthesized image. The pre-processing may include scaling, color, brightness, contrast, and/or sharpness adjustment of the image objects, and/or adjustment of the corresponding 3D depths and/or distances.

The superimposing step comprises a superimpose prioritization processing, a superimpose layering processing, and a post-superimposing processing. During the superimpose prioritization processing, a corresponding superimpose sequence is respectively provided according to the 3D depths and/or distances corresponding to the first superimposing object and the second superimposing object. During the superimpose layering processing, the first superimposing object and the second superimposing object are superimposed into a synthesized image according to the superimpose sequence corresponding to the first superimposing object and the second superimposing object. For example, when the distance of the first superimposing object is smaller than the distance of the second superimposing object, the first superimposing object is reserved, an overlapping part of the second superimposing object with the first superimposing object is removed, and the first superimposing object is then superimposed on the second superimposing object.

During the post-superimpose processing, detailed processing is performed on a superimposed result of the first superimposing object and the second superimposing object. For example, superimposed edges of the first and second superimposing objects are processed by blending, anti-aliasing, and/or feathering, so as to render a more natural-looking superimposed image.

The first and/or second image object is captured from an image. The image may be a 3D image comprising portions respectively corresponding to a visual deviation. According to the visual deviation of each portion of the image, a 3D depth is obtained for each portion of the image.

According to another embodiment of the present invention, an image processing apparatus comprising a depth module, a separation module, an optional pre-processing module, and a superimpose module is provided. The depth module respectively provides a 3D depth for portions of an image. The separation module captures a portion of the image as an image object according to the 3D depth corresponding to each portion of the image. The pre-processing module pre-processes the image object to be the superimposing object. The superimpose module superimposes the image object, and comprises a superimpose prioritization module for superimpose prioritization processing, a superimpose layering module for superimpose layering processing, and a post-superimpose module for post-superimpose processing.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
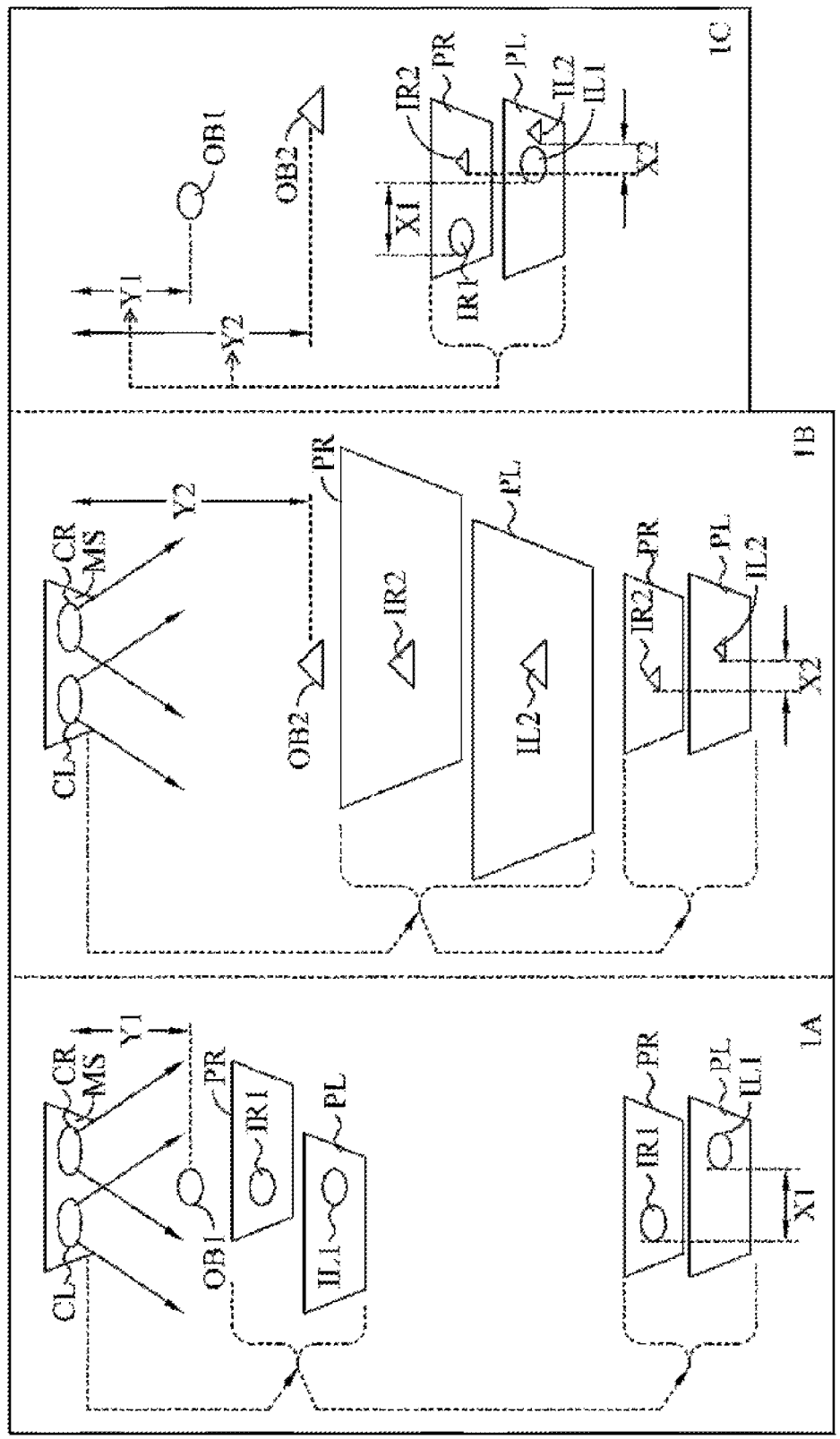
FIG. 1 is a schematic diagram of a 3D image captured by a video camera according to an embodiment of the present invention.

When the same object is observed by both eyes, images presented by the left and right eyes have subtle differences, and the human brain establishes a make-shift three-dimensional (3D) image according to the images perceived by the both eyes. FIG. 1 shows three distinct schematic diagrams of a 3D image, where section 1A details a schematic diagram of a 3D image photographed by a camera MS according to an embodiment of the present invention. The camera MS comprises a left camera lens CL and a right camera lens CR. For an object OB1 located at a distance Y1 from the camera MS, the left camera lens CL captures an image IL1 of the object OB1 in a left image picture PL, and the right camera lens CR captures an image IR1 of the object OB1 in a right image picture PR. According to the left image picture PL and the right image picture PR, a 3D image is formed. A distance from the image IL1 of the left image picture PL to the image IR1 of the right image picture PR is defined as a visual deviation X1. To playback the 3D image, the left image picture PL and the right image picture PR are respectively presented to the left and right eyes of a viewer, such that the 3D image of the object OB1 is observed with the corresponding visual deviation X1 between the images IL1 and IR1.

Similarly, referring to section 1B of FIG. 1, for an object OB2 located at a distance Y2 from the camera MS, the left camera lens CL captures an image IL2 of the object OB2 in a left image picture PL, and the right camera lens CR captures an image IR2 of the object OB2 in a right image picture PR. Likewise, a distance from the image IL2 of the left image picture PL to the image IR2 of the right image picture PR is defined as a visual deviation X2. It is to be noted that, the object OB2 is located farther away from the camera MS than the object OB1 (i.e., Y2>Y1), such that the visual deviation X2 between the images IL2 and IR2 is smaller than the visual deviation X1 between the images IL1 and IR1.

According to the above characteristics, a concept of 3D depth is developed. It is observed from section 1A and section 1B that, by comparing the visual deviations of portions of the left image PL and the right image PR, a distance between an object and the camera MS may be obtained. Supposing the left image picture PL in section 1A is defined as a reference image, the visual deviation X1 between the image IL1 of the left image picture PL and the IR1 of the right image picture PR of the object OB1 is a positive value, which is a 3D depth of the images IL1 and IR1. Similarly, in section 1B, when the left image picture PL is again defined as the reference image, the visual deviation X2 between the image IL2 of the left image picture PL and the IR2 of the right image picture PR of the object OB2 is a positive value, which is a 3D depth of the images IL2 and IR2. In contrast, supposing the right image picture PR is defined as a reference image in section 1A and section 1B, the 3D depth of the images IL1 and IR1 is the negative value of the visual deviation X1, and the 3D depth of the images IL2 and IR2 is the negative value of the visual deviation X2. As shown in section 1C, the distance Y1 between the object OB1 and the camera MS may be acquired by obtaining the 3D depth of the images IL1 and IR1 of the left and right images IL2 and IR2 from comparison. Similarly, the distance Y2 between the object OB2 and the camera MS may be acquired by obtaining the 3D depth of the images IL2 and IR2 of the left and right images IL1 and IR1 from comparison. In other words, it may be concluded which of the objects OB1 and OB2 is closer to or farther away from the camera MS according to these determined 3D depths.

According to the principles of 3D depth shown in section 1C, the image of the object OB1 and the image of the object OB2 in the images PL and PR may be separated into a foreground and a background. More specifically, according to the 3D depths, it is concluded that the object OB1 is located closer to the camera MS and the object OB2 is located farther away from the camera MS, so that the images IL1 and IR1 of the object OB1 are determined as the foreground, and the images IL2 and IR2 of the object OB2 are determined as the background. Therefore, the images IL1 and IR1 of the object OB1 are captured from the images PL and PR to become a foreground image object to accomplish effective background removing of the image.

Figure 2:
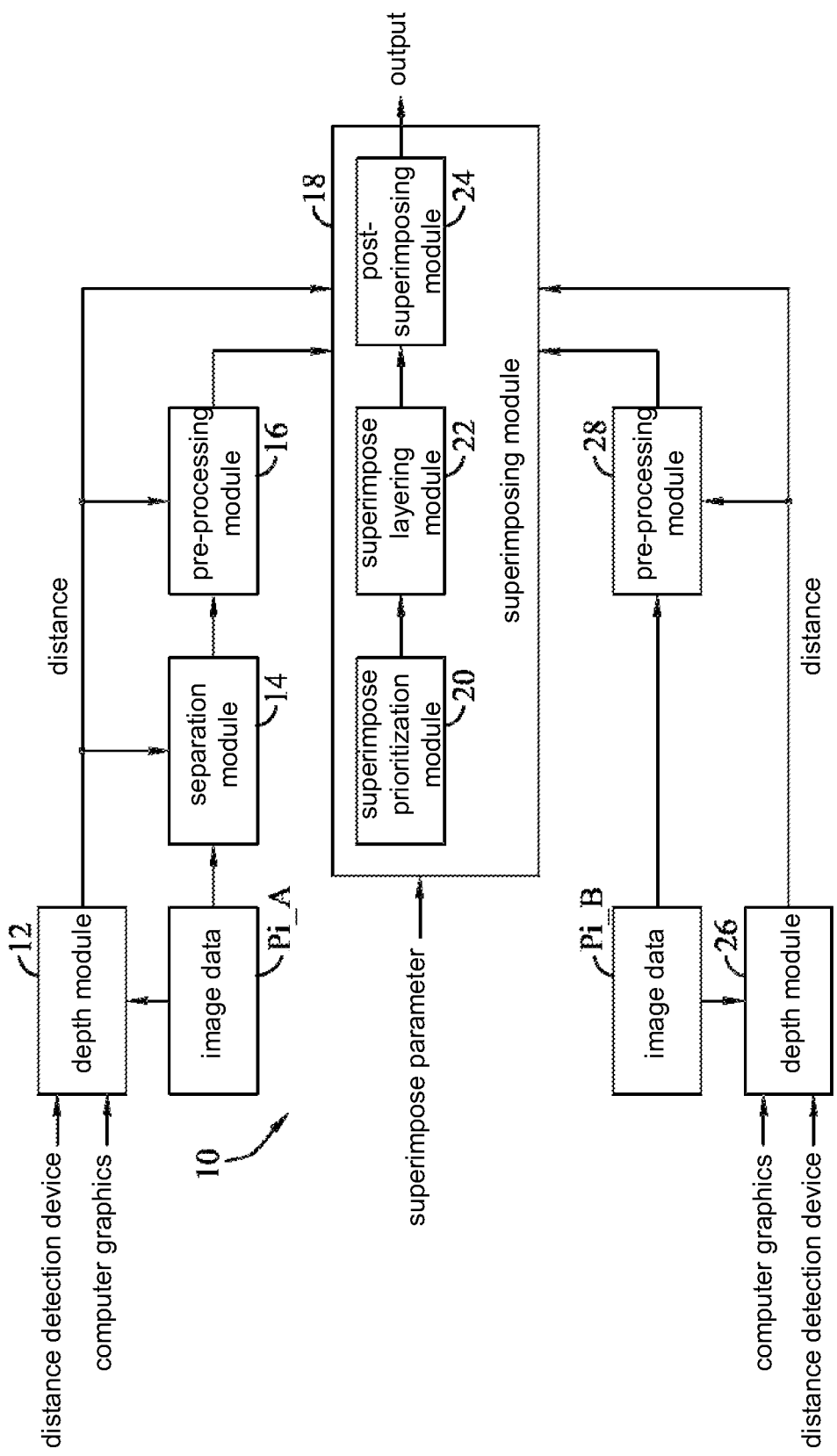
FIG. 2 is a block diagram of an image processing apparatus according to an embodiment of the present invention.

FIG. 2 shows a functional block diagram of an apparatus 10 according to an embodiment of the present invention. The apparatus 10 is an image processing apparatus, which comprises at least one depth module 12 (and optionally an additional depth module 26), a separation module 14, at least one pre-processing module 16 (and optionally an additional pre-processing module 28), and a superimpose module 18. The superimpose module 18 comprises a superimpose prioritization module 20, a superimpose layering module 22, and a post-superimpose module 24.

Figure 3:
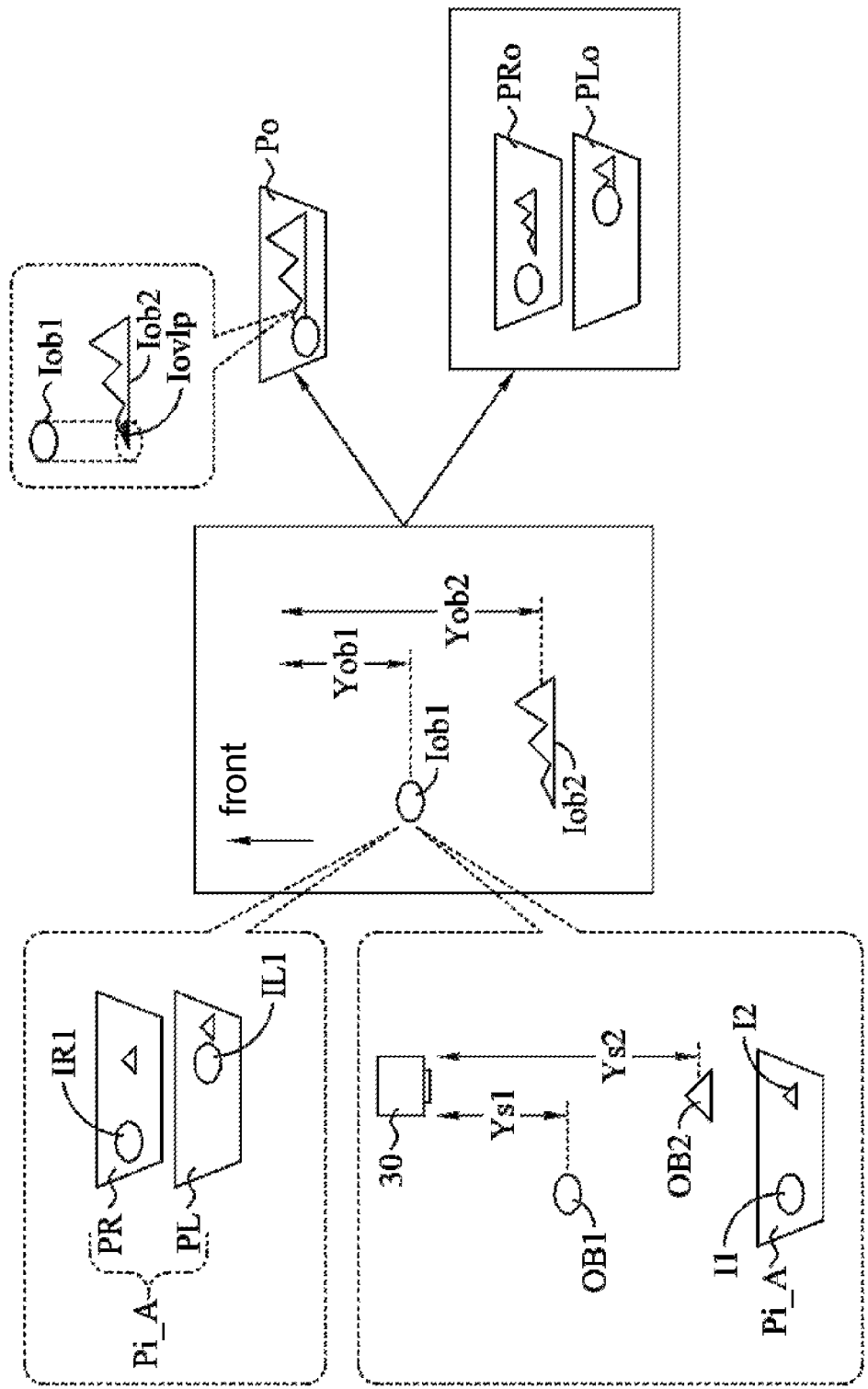
FIG. 3 is a schematic diagram of image processing according to an embodiment of the present invention.

In the apparatus 10, the depth module 12 receives an image data input Pi_A comprising a dynamic or static, 2D or 3D image divided into a plurality of portions. The depth module 12 provides a 3D depth and a distance corresponding to each portion of the image, and the separation module 14 captures a portion of the image as an image object according to the 3D depth and the distance corresponding to each portion of the image. Referring to FIG. 3, for example, the image data Pi_A comprises a 3D image formed by the left image picture PL and the right image picture PR; the depth module 12 provides a corresponding 3D depth for each portion of the 3D image to provide a distance for each portion; and the separation module 14 separates a foreground according to the 3D depths and the distances, e.g., the foreground images IL1 and IR1 are captured as an image object Iob1 according to the principles illustrated in section 1C of FIG. 1. The image object Iob1 corresponds to a distance Yob1 associated with the distance Y1.

According to the principles illustrated in section 1C of FIG. 1, the left image picture PL and the right image picture PR are captured by the camera MS to obtain the 3D depths of the objects OB1 and OB2. In another embodiment, the depth module 12 may also generate the 3D depth with reference to a distance detected by a distance detection device supposing the image data Pi_A is associated with the distance detected by the distance detection device, so as to separate the foreground from the image data Pi_A. Referring to FIG. 3, in an embodiment, when distributed positions of an xy plane of the objects OB1 and OB2 are captured as images I1 and I2 in the image data Pi_A, a distance detection device 30 also detects distances Ys1 and Ys2 of the objects OB1 and OB2 on a normal line perpendicular to the xy plane, (i.e. the z-axis), so that the images I1 and I2 respectively associate with the distances Ys1 and Ys2. The depth module 12 then provides the 3D depths of the images I1 and I2 according to the distances Ys1 and Ys2, and the separation module 14 separates the foreground image I1 as the image object Iob1. For example, the distance detection device 30 can be a laser, infrared, sound-wave, ultrasonic, and/or electromagnetic wave distance detection device.

In another embodiment, the image data Pi_A is obtained with computer graphics rendering from a virtual 3D model. The computer graphics provided may also indicate a distance (e.g., a depth map) of the 3D model or a parameter associated with the distance, and the depth module 12 may generate the 3D depth with reference to the distance provided by the computer graphics or the parameter associated with the distance, enabling the separation module 14 to capture the foreground of the image data Pi_A as an independent image object.

In this embodiment, after the separation module 14 captures out the image object, the image object is pre-processed by the pre-processing module 16. The pre-processing may include scaling, color, brightness, contrast, and/or sharpness adjustment of the image object, and/or corresponding 3D depth/distance adjustment.

Similar to operations of the depth module 12, a depth module 26 may also be included in an embodiment of the present invention to provide a distance corresponding to another image data input Pi_B, which may, for example, be a superimposed image object. Referring to FIG. 3, the image data Pi_B may be an image object lob2 corresponding to a distance Yob2, and the pre-processing module 28 is utilized for pre-processing the image data Pi_B, wherein the pre-processing is similar to that performed by the pre-processing module 16 on the image object lob1.

After obtaining image objects of the image data Pi_A and Pi_B and the corresponding distances, the superimposing module 18 superimposes the image objects of the image data Pi_A and Pi_B according to a superimpose parameter into a synthesized image. For example, the synthesized image can be a 2D or 3D, static or dynamic image. During the superimposing processing, the superimpose prioritization module 20 performs a superimpose priority processing to provide a corresponding superimpose sequence according to the 3D depths and distances corresponding to the image objects. The superimpose layering module 22 superimposes the image objects according to the superimpose sequence to a synthesized image. The post-superimpose module 24 performs post-superimpose processing on the superimposed result of the superimpose layering module 22 by performing detailed processing, such as blending, anti-aliasing, and/or feathering superimposed edges of the image objects to render a more natural looking synthesized object.

FIG. 3 shows operations of the superimpose processing. Upon obtaining the 3D depths and corresponding distances Yob1 and Yob2 of the image objects lob1 and lob2, the superimpose prioritization module 20 defines superimpose priorities and sequence according to the 3D depth. For example, by comparing the 3D depth and the distance Yob1 of the image object lob1 and the 3D depth and the distance Yob2 of the image object lob2, it is concluded that the image object lob1 is located farther in the front of perceived image than the image object lob2, so that the image object lob1 is given a higher superimpose priority than the image object lob2. When the superimpose layering module 22 superimposes the image objects lob1 and lob2 to a 2D synthesized image Po, the image object lob1 with the higher superimpose priority is entirely preserved, whereas an overlapping part (e.g., an overlapping part lovlp) of the superimposed image object lob2 with the superimposed image object lob1 is removed, so as to superimpose the image object lob1 on the image object lob2.

Similarly, an output of the superimposed image may also be a 3D image, e.g., a 3D image comprises left and right images PLo and PRo. The superimposing module 18 respectively performs superimpose layering and post-superimpose processing on the left and right images PLo and PRo. In an embodiment of the present invention, the image object lob1 in the left image picture PLo comes from the image IL1 in the left image picture PL, and the image object lob1 in the right image picture PRo comes from the image IR1 in the right image picture PR. Similarly, if another image data Pi_B also comprises left and right images of a 3D image, the image object lob2 in the left image picture PLo is formed by the left image in the image data Pi_B, and the image object lob2 in the right image picture PRo is formed by the right image in the image data Pi_B.

In another embodiment, the image data Pi_B may also be a 2D image. Under such conditions, to output a 2D image, the image object lob1 may be directly superimposed on the 2D image object lob2 without considering the 3D depth and the distance Yob2. Therefore, as previously stated, the depth module 26 is an optional element, which can be omitted in some cases. In another embodiment, the image data Pi_B is also a 2D image. However, to output a 3D image from the 2D image, the image object lob2 is given a predetermined 3D depth, and the image data Pi_B is utilized as both left and right images of the 3D image, so as to superimpose the left and right images with other image objects to form the 3D image output. The predetermined 3D depth may be defined with reference to the 3D depth of the reference image data Pi_A, or may be given by a user. In detail, as the value of the 3D depth gets greater, the more front the image object is located; thus, when the image data Pi_B serves as a background, the corresponding image object lob2 is given a 3D depth smaller than those corresponding to all other image objects. Alternatively, the 3D depth of the image data Pi_B may also be given by the user to adjust relative distances between the image object lob2 and the image object lob1 on a 3D image output. In another embodiment, the image data Pi_A and/or Pi_B may be a dynamic image formed by a plurality of frames, and the apparatus 10 performs capturing and superimposing of image objects with respect to images of each frame.

It is to be noted that, the superimposing of the two image data inputs Pi_A and Pi_B is merely an example, and the present invention is not limited to processing only two image data inputs. That is, a plurality of image data inputs may be simultaneously processed and superimposed to output various types of image data.

In the apparatus 10, the pre-processing modules 16 and 28 adjust image objects according to superimpose and synthesis requirements of the image objects. For example, the pre-processing module 16 may reduce the distance Yob1 and correspondingly enlarge the image object lob1, so that the image object lob1 is positioned more to the front in the synthesized image. Alternatively, the pre-processing module 16 may also increase the brightness of the image object lob1 to emphasize the image object lob1. In contrast, the pre-processing module 28 may reduce the brightness of the image object lob2 and decrease the sharpness with blurring, so as to present shallow depth of field effects in the synthesized image. It is to be noted that the implementation of pre-processing modules 16 and 28 may include optionally functional elements that are provided according to actual application requirements.

Please note that each of the modules in the apparatus 10 can be implemented by hardware, firmware, software, or any combination thereof. The depth module 12 and the depth module 26 may be a single module, and the pre-processing module 16 and the pre-processing module 28 may also be a single module.

For example, the present invention can be applied to filming of movies, where the image data Pi_A and Pi_B are individually filmed and then superimposed according to operational principles of the apparatus 10. Furthermore, the present invention is also applicable to image processing and editing of photographs as well as to playbacks of video telephone calls, video conference, and/or Internet video. For example, video conference participants are captured by the 3D video camera (FIG. 1) to form the image data Pi_A, and images of the participants are separated from the background according to techniques of the present invention and then superimposed and synthesized with the background of another image data Pi_B. In addition, the present invention is particularly applicable to the travel industry, multimedia applications, sports, educations, entertainment, and games. For example, a user is captured by the 3D video camera MS, and the user image is separated from the background and then superimposed and synthesized with a virtual background of a game.

With the embodiments of the present invention, it is illustrated that by separating a foreground from a background according to the 3D depth, the foreground may be independently utilized so as to facilitate not only more accurate and convenient image processing but also more diversified image contents.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of image processing, comprising:
   receiving a first image and a second image;
   obtaining three-dimensional (3D) depths corresponding to a portion of the first image indicating a distance corresponding to an object in the portion of the first image by comparing visual deviations of the object in the portion of the first image and a corresponding object in the second image;
   capturing the portion of the first image as a first image object according to the 3D depths to generate a first superimposing object;
   obtaining a second image object according to a portion of the second image to generate a second superimposing object; and
   superimposing the first superimposing object and the second superimposing object to generate a synthesized image;
   wherein, the first image is generated by a plurality of image frames respectively comprising a plurality of same objects, and the step of obtaining the corresponding 3D depths according to the portion of the first image is to calculate a plurality of displacements between each of the respective objects in the plurality of image frames to obtain a plurality of 3D depths associated with the plurality of objects, and the portion of the first image is associated with one of the plurality of objects.

2. The method according to claim 1, wherein the step of capturing the portion of the first image as the first image object according to the 3D depths to generate the first superimposing object comprises pre-processing the first image object to generate the first superimposing object;
   wherein the pre-processing comprising adjusting size, color, brightness, sharpness, or 3D depths of the first image object.

3. The method according to claim 1, wherein the step of obtaining the second image object according to the portion of the second image to generate the second superimposing object comprises pre-processing the second image object to generate the second superimposing object;
   wherein the pre-processing comprises adjusting size, color, brightness, sharpness, or 3D depths of the second image object.

4. The method according to claim 1, wherein the step of obtaining the second image object according to the portion of the second image to generate the second superimposing object comprises obtaining a 3D depths corresponding to the portion of the second image and capturing the portion of the second image as a second image object.

5. The method according to claim 4, wherein the step of superimposing comprises:
   providing a plurality of prioritization weightings corresponding to the first superimposing object and the second superimposing object according to the plurality of 3D depths corresponding to the first image object and the second image object, the prioritization weightings being associated with a superimpose sequence; and
   performing a superimpose layering processing to superimpose and synthesize the first superimposing object and the second superimposing object to the synthesized image according to the superimpose sequence.

6. The method according to claim 1, further comprising designating a corresponding 3D depths to the second image object.

7. The method according to claim 6, wherein the step of designating the corresponding 3D depths to the second image object comprises designating the corresponding 3D depths to the second image object with reference to the 3D depths corresponding to the first image object.

8. The method according to claim 6, wherein the step of designating the corresponding 3D depths to the second image object comprises designating the corresponding 3D depths to the second image object with reference to manually inputted setting information.

9. The method according to claim 6, wherein the step of superimposing comprises:
   providing a plurality of prioritization weightings corresponding to the first superimposing object and the second superimposing object according to the plurality of 3D depths corresponding to the first image object and the second image object, with the prioritization weightings being associated with a superimpose sequence; and
   performing a superimpose layering processing to superimpose and synthesize the first superimposing object and the second superimposing object to the synthesized image according to the superimpose sequence.

10. The method according to claim 1, wherein the step of superimposing comprises performing a post-superimposing with blending, anti-aliasing, and feathering on a plurality of edges of the first superimposing object and the second superimposing object.

11. An image processing apparatus, comprising:
    a depth hardware module, configured for obtaining 3D depths for a portion of a first image indicating a distance corresponding to an object in the portion of the first image by comparing visual deviations of the object in the portion of the first image and a corresponding object in the second image;
    a first image processing hardware module, configured for capturing the portion of the first image as a first image object according to the 3D depths to generate a first superimposing object;

a second image processing hardware module, configured for obtaining a second image object according to a second image to generate a second superimposing object; and a superimposing hardware module, configured for superimposing the first superimposing object and the second superimposing object to generate a synthesized image;

wherein the first image is formed by a plurality of image frames respectively comprising a plurality of same objects, the first image processing hardware module respectively calculates a plurality of displacements between each of the object in the plurality of image frames, respectively, to obtain a plurality of 3D depths associated with the plurality of objects, and the portion of the first image is associated with one of the objects.

12. The apparatus according to claim 11, wherein the first image processing module and the second image processing module respectively comprise:

a first pre-processing hardware module, configured for pre-processing the first image object to generate the first superimposing object, with the pre-processing comprising adjusting size, color, brightness, sharpness, or 3D depths of the first image object; and a second pre-processing hardware module, configured for pre-processing the second image object to generate the second superimposing object, with the pre-processing comprising adjusting a size, color, brightness, sharpness, or 3D depths of the second image object.

13. The apparatus according to claim 11, wherein the second image processing hardware module comprises a capturing module for obtaining a 3D depths corresponding to the portion of the second image and capturing the portion of the second image as a second image object.

14. The apparatus according to claim 11, wherein the superimposing module comprises:

a superimposing prioritization hardware module, configured for providing a plurality of prioritization weightings corresponding to the first superimposing object and the second superimposing object according to the plurality of 3D depths corresponding to the first image object and the second image object, the prioritization weightings being associated with a superimpose sequence; and a superimpose layering hardware module, configured for performing a superimpose layering processing to superimpose and synthesize the first superimposing object and the second superimposing object to the synthesized image according to the superimpose sequence.

15. The apparatus according to claim 11, further comprising a depth designating hardware module configured for designating a corresponding 3D depths to the second image object.

16. The apparatus according to claim 15, wherein the superimposing hardware module comprises:

a superimposing prioritization hardware module, configured for providing a plurality of prioritization weightings corresponding to the first superimposing object and the second superimposing object according to the plurality of 3D depths corresponding to the first image object and the second image object, with the prioritization weightings being associated with a superimpose sequence; and a superimpose layering hardware module, configured for performing a superimpose layering processing to superimpose and synthesize the first superimposing object and the second superimposing object to the synthesized image according to the superimpose sequence.

17. The apparatus according to claim 11, wherein the superimposing hardware module further comprises:

a post-superimposing hardware module, for post-superimposing the synthesized image with blending, anti-aliasing, and feathering on a plurality of edges of the first superimposing object and the second superimposing object.

\* \* \* \* \*